(12) United States Patent
Stevens (10) Patent No.: US 7,999,841 B1
(45) Date of Patent: Aug. 16, 2011

(54) IMAGE EXPANSION SYSTEM TO CREATE LARGER SIZE OR LARGER RESOLUTION IMAGES

(75) Inventor: Rick C. Stevens, Apple Valley, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 1361 days.

(21) Appl. No.: 11/506,235

(22) Filed: Aug. 18, 2006

(51) Int. Cl.
*H04N 5/225* (2006.01)
(52) U.S. Cl. .................. 348/36; 348/218.1; 348/219.1
(58) Field of Classification Search ............ 348/36–39, 348/218.1, 219.1
See application file for complete search history.

(56) References Cited

U.S. PATENT DOCUMENTS

| | | | |
|---|---|---|---|
| 4,131,021 A | 12/1978 | Mezrich et al. | |
| 5,754,226 A * | 5/1998 | Yamada et al. | 348/219.1 |
| 5,889,553 A * | 3/1999 | Kino et al. | 348/218.1 |
| 5,907,353 A * | 5/1999 | Okauchi | 348/218.1 |
| 6,396,042 B1 | 5/2002 | Boardman et al. | |
| 6,466,961 B1 | 10/2002 | Miller | |
| 6,636,664 B2 | 10/2003 | Snyder et al. | |
| 6,734,903 B1 * | 5/2004 | Takeda et al. | 348/219.1 |
| 6,765,644 B1 | 7/2004 | Anderson et al. | |
| 6,855,923 B2 | 2/2005 | Boardman et al. | |
| 7,136,096 B1 * | 11/2006 | Yamagishi et al. | 348/218.1 |
| 2002/0150299 A1 | 10/2002 | Miller | |
| 2004/0057656 A1 | 3/2004 | Chu et al. | |
| 2005/0195505 A1 | 9/2005 | Braun et al. | |
| 2005/0270387 A1 * | 12/2005 | Watanabe et al. | 348/240.99 |

* cited by examiner

*Primary Examiner* — Timothy J Henn
(74) *Attorney, Agent, or Firm* — Larkin Hoffman Daly & Lindgren Ltd.; Craig J. Lervick (57) ABSTRACT

The disclosure is directed to an electro-optical imaging system that includes an image selection assembly that receives images along a movable optical axis and provides the images to a sensor disposed on a fixed optical axis. The movable axis is movable with respect to the fixed axis. The disclosure is also directed to a method for use with the imaging system. The method includes: positioning the movable optical axis at a selected first position to obtain a first image; sampling the first image with the sensor; repeatedly positioning the movable optical axis at another selected position to obtain another image, and sampling the another image until a number of at least two or more images are sampled; and assembling the sampled images into a final image.

11 Claims, 6 Drawing Sheets

IMAGE EXPANSION SYSTEM TO CREATE LARGER SIZE OR LARGER RESOLUTION IMAGES

BACKGROUND OF THE INVENTION

This disclosure relates to optical image expansion systems for creating larger size or resolution electro-optical images, such as infrared images, than otherwise available with a given electro-optical sensor. More particularly, this disclosure relates to a system and method that samples a number of images of an object with an available electro-optical sensor through an image selection assembly and processes the images in such a manner so as to create a larger size or resolution of the image than that possible with the given sensor.

Prior art electro-optical imaging systems typically include an electro-optical sensor with supporting optics arranged as an electro-optical camera. Sensors are often arranged as an array of pixels. Arrays of pixels are often arranged in standard sizes such as 320×240 pixels (76,800 total pixels), 640×480 (307,200 total pixels), or the like. Supporting optics are similar to those found on photographic cameras and can include a variety of lenses of different speeds, focal lengths, and optical quality. Typically, the size of the sensor determines the size and/or resolution of the image detected by the sensor. Also, the supporting optics can further limit image resolution or size.

In addition to the issues of size and resolution, typical consumers of electro-optical imaging systems are concerned about the cost of their systems. In the prior systems, costs tend to increase geometrically over relatively small increases in size and resolution of sensors. Large sensors and improved supporting optics that are needed to provide larger resolution or size of images are generally very expensive components in the electro-optical systems. Despite the expense, greater size and resolution of images are often necessary or desired in many applications.

Thus, there exists a need to improve image size and resolution in electro-optical imaging systems without dramatically increasing the cost of these systems.

BRIEF SUMMARY OF THE INVENTION

The present disclosure is directed to a system and method for creating larger size or resolution electro-optical images than would otherwise be available with a given sensor. The system includes components that are less expensive than larger sensors and supporting optics that would produce images of similar size or resolution.

In one aspect, the disclosure is directed to an imaging system, having a sensor, an image selection assembly, a position control, a sampling control and a processor. The sensor is disposed on fixed optical axis is adapted to receive and sample images of a given size or resolution. The image selection assembly includes a movable optical element coupled to an actuator. The movable optical element includes a movable optical axis that is movable with respect to the fixed optical axis. The position control is operably coupled to the actuator. The position control is adapted to select a plurality of positions of the movable optical axis through movement of the optical element with the actuator. The sampling control is operably coupled to the position control and to the sensor. The sampling control receives the position of the movable optical axis from the position control. The sampling control is adapted to cause the sensor to sample a first selected location of the movable optical axis and to sample at least a second image at a second selected location of the movable optical axis. The processor is operably coupled to the sensor and adapted to receive the first and at least second sampled images. The processor is adapted to assemble the received sample images into a final image having a greater size or resolution than the corresponding size or resolution of the sensor.

In another aspect, the disclosure is directed to a method for use with an imaging system that includes an image selection assembly that receives images along a movable optical axis and provides the images to a sensor disposed on a fixed optical axis. In this system, the movable optical axis is movable with respect to the fixed optical axis. The method of this aspect includes: positioning the movable optical axis at a selected first position to obtain a first image; sampling the first image with the sensor wherein the sampled first image includes a size or a resolution; repeatedly positioning the movable optical axis at another and unique selected position to obtain another image and sampling the another image until a selected number of a plurality of images are sampled; and assembling the sampled images into a final image having a greater size or resolution than the corresponding size or resolution of the sampled first image.

BRIEF DESCRIPTION OF THE DRAWINGS

FIGS. 8A, 8B, 8C, and 8D are schematic diagrams of separate aspects of a particular example operation of the system of FIG. 3, where

DETAILED DESCRIPTION OF THE INVENTION

This disclosure relates to optical image expansion systems for creating larger size or resolution electro-optical images than otherwise available with a given electro-optical sensor. The disclosure, including the figures, describes the systems components and their parts with reference to several illustrative examples. For example, the present disclosure proceeds with respect to the particular image selection assemblies, a particular arrangement of system components, and particular methods of image sampling and assembly described below. However, it should be noted that the present invention could be implemented in other optical components, with other arrangements of system components, and with other methods of sampling and assembly, as well. The present disclosure proceeds with respect to the particular components, their arrangement, and methods for illustrative purposes only. Other examples are contemplated and are mentioned below or are otherwise imaginable to someone skilled in the art. The scope of the invention is not limited to the few examples, i.e., the described embodiments of the invention. Rather, the scope of the invention is defined by reference to the appended claims. Changes can be made to the examples, including alternative designs not disclosed, and still be within the scope of the claims.

Figure 1:
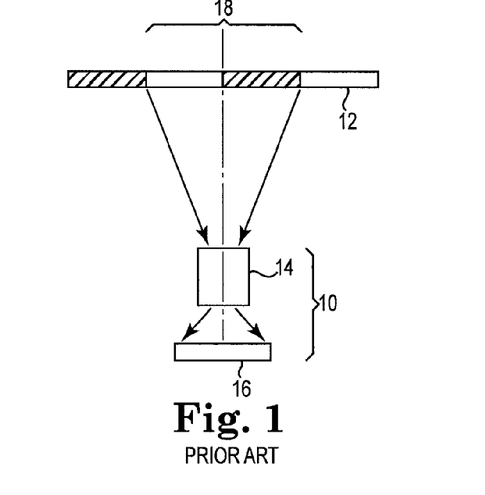
FIG. 1 is schematic diagram of a prior art imaging system.

FIG. 1 is a schematic diagram of a prior art electro-optical imaging system 10, such as an infrared camera. The system 10 is positioned to detect an object 12. The system 10 includes a lens assembly 14 to focus light from the object 12 as an image onto a sensor 16 in the focal plane of the lens assembly 14. The sensor 16 in the system 10 includes pixels arranged in a typical format of 320×240. As indicated, only a portion 18 of the object 12 is presented to the sensor 16 as the image. Significantly more expensive lenses, sensors, or both are available in the prior art and are used to make improvements in image size or resolution than that available in the system 10 shown in the figure.

Figure 2A:
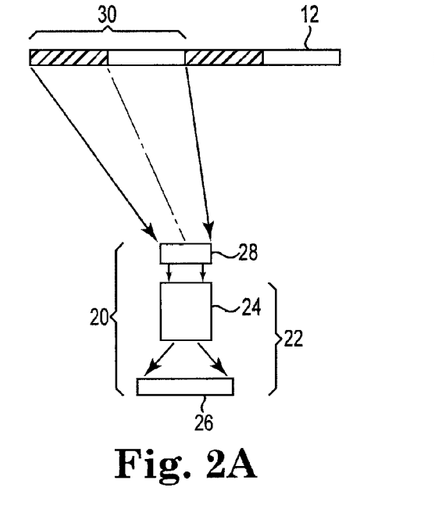
FIG. 2A is a schematic diagram of an imaging system of the present disclosure in a first position.
Figure 2B:
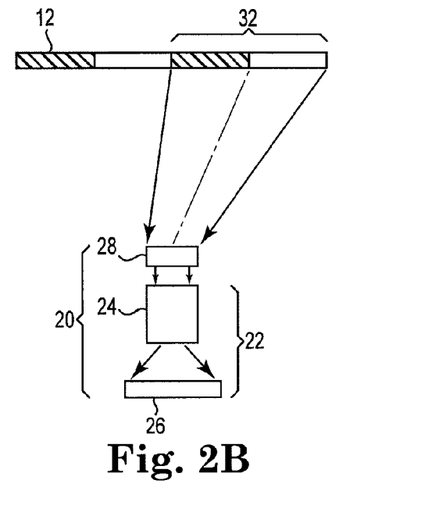
FIG. 2B is a schematic diagram of an imaging system of the present disclosure in a second position.

FIGS. 2A and 2B are schematic diagrams of an imaging system 20 of the present disclosure operated to detect the object 12. In one example where system 20 includes a camera 22, lens assembly 24 in combination with a 320×240 pixel sensor 26, which sensor 26 is disposed in the focal plane of the system 20. The system 20 also includes an image selection assembly 28 in combination with the camera 22 to control which portion of the object 12 includes light that is presented to the sensor 26 as the image. In this example, the system takes a first picture, such as an infrared image, of a first portion 30 of the object.

As shown in FIG. 2A, a first portion 30 of the object 12 is imaged onto the sensor 26. The camera 22 is held relatively stationary to the object 12, and the image selection assembly 28 is adapted to select the first portion 30 of the object 12, which can be comparable in size to the portion 18 of the prior art image shown and described with respect to FIG. 1. Light from this portion 30 of the object is provided through the system and results as an image on sensor 26.

In FIG. 2B, a second portion 32 of the object 12 is imaged onto the sensor 26. The camera 22 is still held relatively stationary to the object 12. The image selection assembly 28 is adapted to select another portion 32 of the object 12, which can also be comparable in size to the portion 30. Light from this portion 32 of the object is provided through the system and results as an image on sensor 26. In this example, the system takes a second picture of the second portion of the object. The first and second pictures of the object are then processed in such a manner so as to create a final mosaic of a larger version of the object than that possible with the prior art system.

The example of FIGS. 2A and 2B show a system 20 that is used to create larger images of objects than with the prior art system 10, but other uses of the system 20 are possible and contemplated. For example, the portions 30, 32 of the objects in the images of each picture are comparable to the size of the portion of the object in the prior art. After the pictures are processed, the overall amount of the object in the final mosaic was larger than that of the prior art. Instead of increasing the width and/or length of the object, the system could be used to increase the resolution of a comparably sized image of the prior art. In this case, rather than taking pictures of portions that are the same size as in the prior art, the portions in the image could be made smaller, and thus increase the resolution of the object in the final mosaic. Other uses of this system are contemplated.

Figure 3:
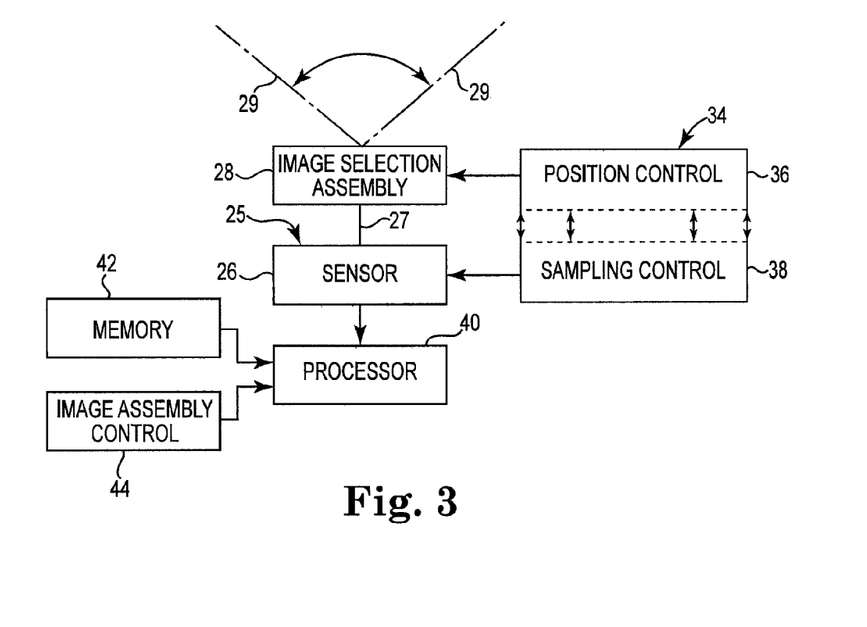
FIG. 3 is a schematic diagram of a general example imaging system suitable for use as the imaging system of FIGS. 2A and 2B.

FIG. 3 shows a schematic diagram of an example system 20. The system 20 includes the image selection assembly 28 providing light from an object on and about a movable optical axis 29 to the electro-optical sensor 26 in a focal plane 25. The sensor 26 is on a relatively fixed optical axis 27, which in the example is generally perpendicular to the focal plane 25. The image selection assembly 28 and sensor 26 are operably coupled to a controller 34. The controller 34 includes two aspects, i.e., a position control 36 and a sampling control 38. In one alternative example, the two aspects are each in a separate controller. The position control 36 is operably coupled to the image selection assembly 28. In one example, the position control 36 is used to operate and position the image selection assembly 28 to point in a selected direction for taking a picture, or to move the movable optical axis 29 relative to the fixed optical axis 27. The sampling control 38 is operably coupled to the sensor 26 and the position control 36. The sampling control 38 receives information from the position control 36 as to where the image selection assembly 28 is pointed at a given time. It then uses this information to determine the correct time to sample the image presented to the sensor 26, or to take a picture. The pictures are presented to a processor 40, coupled to a memory 42 and also coupled to an image assembly control 44. The processor 40 can either store the pictures in the memory 42, or retrieve pictures from memory 40 and select the operation of the image assembly control 44. With the image assembly control 44, the processor creates the final mosaic of a set of pictures and provides a final image.

One example of the electro-optical sensor 26 is available under the trade designation U3000 Uncooled Microbolometer Infrared Sensor, from DRS Technologies, Inc., of Parsippany, N.J. This sensor is a 320×240 pixel (76,800 active pixels) uncooled focal-plane that is based on VOx resistive microbolometer technology. The focal-plane provides a single-channel signal output at up to 60 Hz frame rates. This focal plane array type sensor has a wide variety of applications, ranging from military night sights and driving aids to area surveillance, firefighting, industrial radiometry, search and rescue, border patrol, vehicle collision-avoidance, and others. The sensor 26 can also be included in an infrared or electro-optical camera such as one available from DRS Technologies and sold under the trade designation E3000 series, which includes optics and a 320×240 pixel focal plane array sensor.

One example of the image selection assembly 28 is a Risley prism assembly. The Risley prism assembly can include two or more coaxial wedge prisms, which can rotate relative to at least one wedge prism about the axis. As the wedges rotate relative to each other, the Risley prism assembly receives light from different portions of the area of the viewing plane, or the entire area that provides light to Risley prism assembly as it rotates about the axis. Several mechanical devices are known to rotate the prism wedges, such as actuators receiving signals from the position control 36. Other types of optical assemblies or devices suitable for use in the image selection assembly include pointing optics, MEMS, deformable mirrors, gimbaled optics, or other optical assemblies or devices that are able to receive a light source from a plurality of selected portions of a usable viewing area and redirect the light source to a selected element, such as the sensor 26 or camera, of the system 20.

Figure 4:
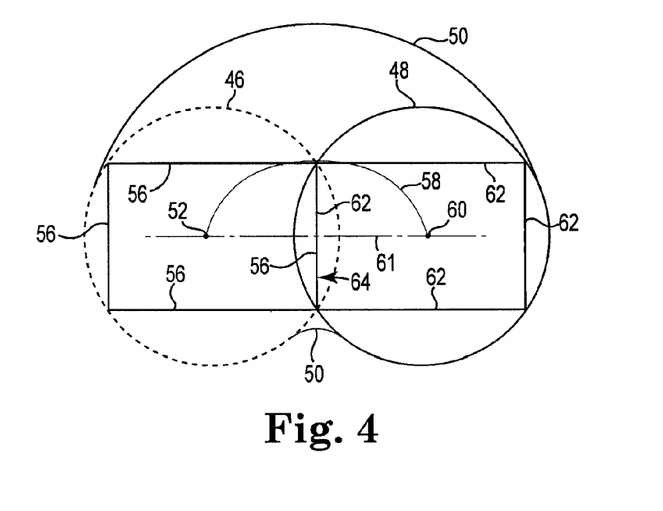
FIG. 4 is a schematic diagram of an example operation of the imaging system of FIG. 3.

FIG. 4 shows an example schematic diagram illustrating operation of the system 20, and showing the range of images presented to the sensor 26 as the image selection assembly 28 scans selected portions, or viewable areas 46, 48, of a particular usable viewing area 50 over a period of time. This period of time includes the range of $t_0$ to $t_1$. In this example, the optical axis of the image selection assembly 28 is positioned to intersect point 52 in the viewing area at time $t_0$. The curvilinear viewable area 46 indicated in phantom represents the area of the image selection assembly at time $t_0$ that is available to be detected by a sensor 26. The rectangular imaging area 56 within area 46 represents the actual imaging area of the sensor 26, in the example a 320×240 pixel sensor. The imaging area 56 is a subset of the viewable area 46. In this example, the position control 36 determines that the viewable area 46 is disposed about the optical axis at point 52 at time $t_0$, and then it sends a signal to the sampling control 38 to take a picture with the sensor 26 at time $t_0$.

The position control then moves the image selection assembly so that the optical axis intersects the viewing area 50 along a pre-selected path, such as that path indicated in line 58. However, with various image selection assembly 28 implementations a variety of image selection paths can be used. The optical axis of the image selection assembly 28 is positioned to intersect point 60 in the viewing area at time $t_1$. The curvilinear viewable area 48 represents the area of the image selection assembly at time $t_1$ that is available to be detected by a sensor 26. The rectangular imaging area 62 within area 48 represents the actual imaging area of the sensor 26 at time $t_1$. The imaging area 62 is again a subset of the viewable area 48. In this example, the position control 36 determines that the viewable area 48 is disposed about the optical axis at point 60 at time $t_1$, and then it sends a signal to the sampling control 38 to take a picture with the sensor 26 at time $t_1$.

In this example, two 320×240 images from imaging areas 56 and 62 can be made to appear as one 640×240 final image in the mosaic. In this case, the final image size or resolution is expanded along a single dimension, i.e., along the dimension represented by a line 61 drawn through points 52 and 60. The final image size or resolution can be further expanded along an additional dimension by taking pictures at points where the optical axis is not on the line 61. Thus, the final image size or resolution can be made larger about two dimensions if the systems were to take two or more pictures along line 61 and one or more pictures that are not along line 61. Additionally, taking pictures along a third dimension, such as multiple images at various distances along a fixed optical axis, in addition to the pictures above, is also contemplated.

In the example of FIG. 4 described above, where two 320×240 images can be made to appear as one 640×240 image in the final mosaic, the rectangular imaging areas 56, 62 share a common border, border 64. In the case of a common border 64, the final mosaic of pictures taken at imaging area 56, 62 is the widest possible final mosaic without a gap of the usable viewing area 50 between the imaging areas 56, 62. A final mosaic with gaps between imaging areas is contemplated as useful at times, and in some circumstances these gaps can be "filled-in" through such methods as interpolation techniques, for example with software or the like.

Figure 5:
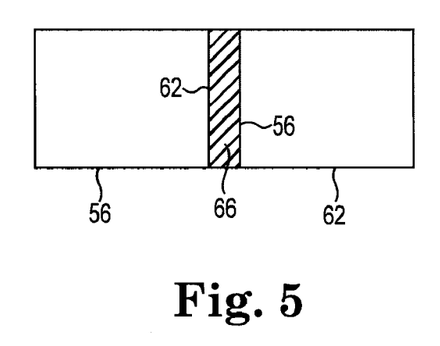
FIG. 5 is a schematic diagram of another example operation of the imaging system of FIG. 3.

FIG. 5 shows an example where the imaging areas 56, 62 include an "overlapping portion" 66 where some of the pixels in a first portion of imaging area 56 are set to image the same part of the viewing area 50 as some of the pixels in a second portion of imaging area 62. Overlapping portions can be created deliberately through particular sampling techniques at overlapping positions or with a particular optical divergence of the optical systems in a camera or the image selection assembly 28. Overlapping portions can also be a consequence as the object comes nearer to the system 20. In this example, the closer the object gets to the system 20, the greater the overlap will be. Overlapping portions, such as overlapping portion 66 of imaging areas 56, 62, can be used to "stitch" the images together to create the final mosaic, as will be described in greater detail below. In certain circumstances, then, the minimum amount of overlap can be set at the maximum distance from the system 20 that the object will be viewed.

Figure 6:
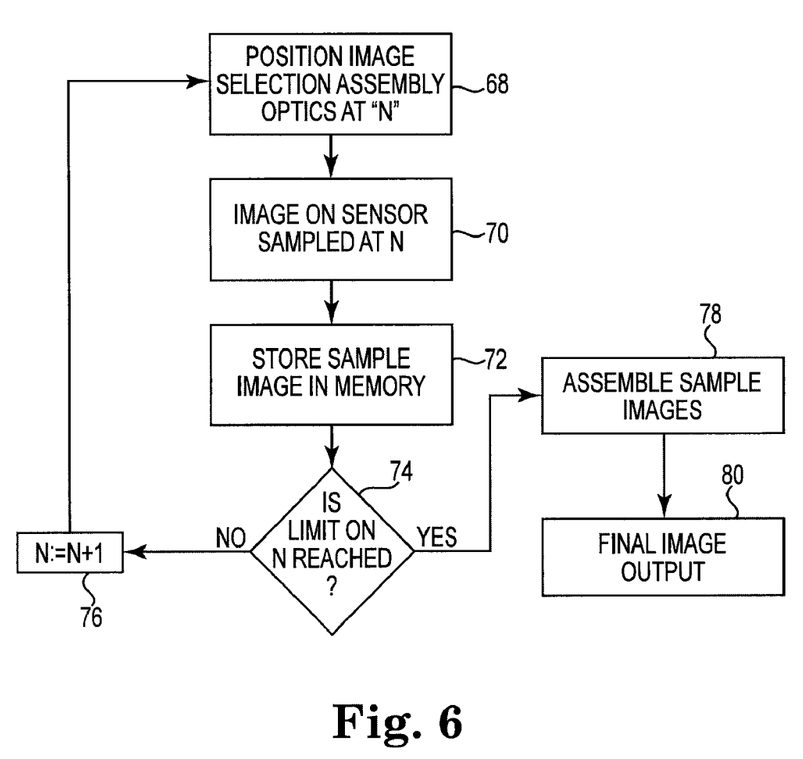
FIG. 6 is a flow diagram of a particular method for operation of the imaging system of FIG. 3.

FIG. 6 is a flow diagram of a particular method for the operation of the imaging system 20. In step 68, the image selection assembly 28 optics is set to an initial position, such as the position of its optical axis in space, labeled as "n" in this example, such as n is set to position 0 for preparation for the first image. The position n is provided between the position control 36 and sampling control 38 aspects of the controller 34. At step 70, the image provided to the sensor 26 is sampled at position n. In the case where the image selection assembly 28 is continuously moving with respect to time, the aspects of the controller 34 can continuously communicate to ensure that the sensor 26 will sample the image at the time when the image selection assembly located at position n. In step 72, the image sampled at the sensor 26 is stored in the memory 42. In one example, the sampled image is provided first to the processor 40 and then stored in memory 42 at a known address for later retrieval and further processing. Other data, such as position or the like can be stored as well. At step 74, the process is repeated until the sensor 26 samples images at all of the pre-selected positions. In this example, the limited is reached when n is equal to a selected threshold amount of greater than 0. If the selected threshold amount is not reached, i.e., if the complete set of images have not yet been sampled, n is incremented in this example, and the process is repeated as shown at step 76. Once the selected complete set of images is sampled, in this example, the processor 40 can begin assembling the sampled images together at step 78, to obtain the final mosaic and return the final image 80. In another example, the process of assembling the images together can begin as soon as the second image is sampled. Other examples are contemplated.

Figure 7:
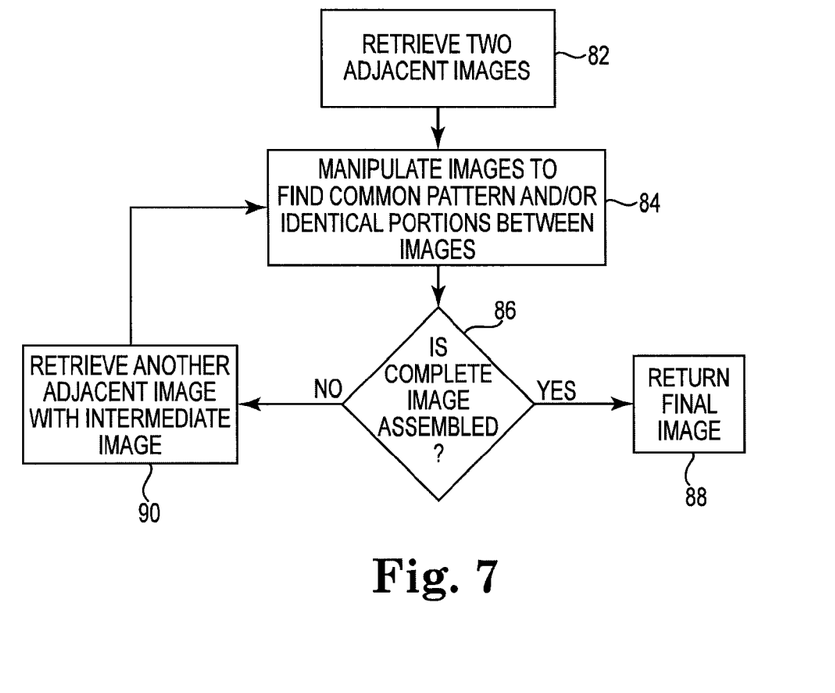
FIG. 7 is a flow diagram of a component of the flow diagram of FIG. 6, showing a particular example method of operation of the component of the flow diagram of FIG. 6.

FIG. 7 is a flow diagram of an example of the assembling component 78, or the assembling of the sampled images into a final image, of the above example in FIG. 6. In the example of FIG. 7, two sampled images are assembled together to create a intermediate image or partial mosaic, and additional images are attached to sampled images in the partial mosaic to create another partial mosaic until a final mosaic of all the sampled images are assembled. The mosaic is a partial mosaic if not all of the selected sampled images are included or a final mosaic if all of the selected sampled images are included. In this example, the images are serially assembled together. At step 82, two adjacent images are selected from memory 42 and provided to the processor 40. The adjacent images of the example share a common border or edge as in FIG. 4, or share an overlapping portion as in FIG. 5. In some cases, adjacent images can be spaced apart from each other and are opposite each other across a gap. In one example, one of the adjacent images is the reference image. In step 84, the processor 40 manipulates the images to find a common pattern in the case of images sharing a common border, or to overlap an identical set of pixels in the case of images with overlapping portions. In this step of this example, the assembled component sampled images form a mosaic. The mosaic can control data corresponding with information about the positions of each of the component sampled images. If the complete set of sampled images is assembled, at determining step 86, the final image is returned at step 88. If the complete set of images has not been assembled, step 86 moves the process to step 90 to retrieve another adjacent image and then to step 84 to assemble another sampled image to an adjacent image already in the intermediate image. In the example, this adjacent image to the partial mosaic becomes the new reference image. Once the intermediate image contains all of the sampled images, the final mosaic can be further processed to remove noise, make error corrections, or the like to produce the final image, at step 88.

Of course, variations of this process are contemplated. For example, the processor can assemble all of the images together at once, determining the identical or common pattern of overlapping or common border sampled images, respectively. Intermediate of final processing of assembled images can be performed as the images are being stitched together. Images can be assembled together in separate sets and then brought together in a final mosaic. Still further examples are contemplated and are considered within the scope of this disclosure.

FIG. 8A and FIGS. 8B-8D are schematic diagrams of separate aspects of a particular example operation of an example of the system of FIG. 3. In this example, the sensor 26 used is 320×240 pixel sensor of the type now familiar in the art. The image selection assembly 28 includes a co-axial multi-wedge Risley prism assembly actuated in response to signals provided from the controller 34.

Figure 8A:
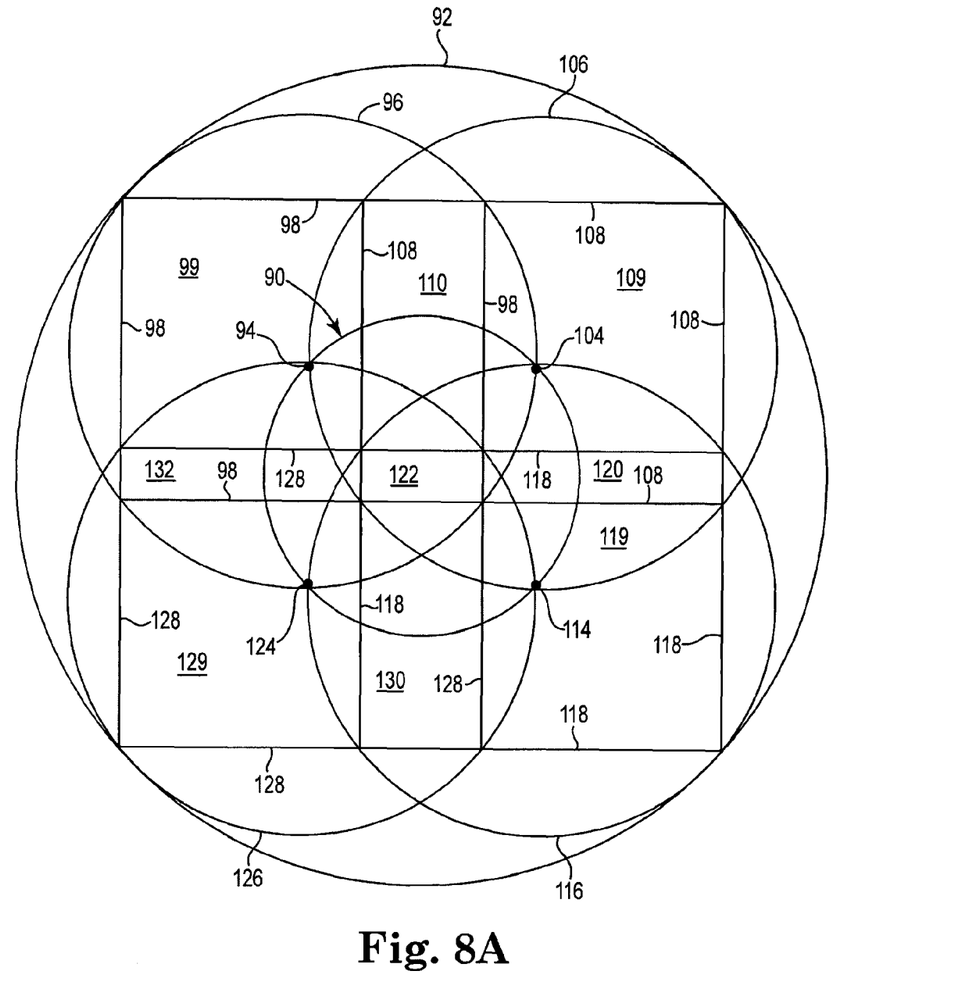
FIG. 8A is a schematic diagram of the operation of the system of FIG. 3 as it obtains and samples images; and where

FIG. 8A is a schematic diagram of the operation of system 20 to obtain and sample images to be stored in the memory 42. As the Risley prism rotates completely about the axis of its prisms, the optical axis of the system traces a generally circular path, indicated at 90, across the viewing area 92. In addition, the viewing area 92 represents the total area that is visible and presented through the image selection assembly 28. In the present example, the viewing area 92 is also circular.

At time $t_0$, the position of the optical axis intersecting the viewing area along path 90 is located at first point 94. The first viewable area of the system at time $t_0$ is indicated at 96, and the first imaging area that is presented to the sensor 26 at time $t_0$ is indicated at 98. The first imaging area 98 is sampled and the resulting first image 99 is stored in memory 42.

At time $t_1$, the position of the optical axis intersecting the viewing area along path 90 is located at second point 104. The second viewable area of the system at time $t_1$ is indicated at 106, and the second imaging area that is presented to the sensor 26 at time $t_1$ is indicated at 108. As shown, the second imaging area 108 includes an overlapping portion 110 that overlaps the first imaging area 98. The second imaging area 108 is sampled and the resulting second image 109 is stored in memory 42.

At time $t_2$, the position of the optical axis intersecting the viewing area along path 90 is located at third point 114. The third viewable area of the system at time $t_2$ is indicated at 116, and the third imaging area that is presented to the sensor 26 at time $t_2$ is indicated at 118. As shown, the third imaging area 118 includes an overlapping portion 120 that overlaps the second imaging area 108. The third imaging area 118 also includes an overlapping portion 122 that overlaps the first imaging area 98. The third imaging area 118 is sampled and the resulting third image 119 is stored in memory 42.

At time $t_3$, the position of the optical axis intersecting the viewing area along path 90 is located at fourth point 124. The fourth viewable area of the system at time $t_3$ is indicated at 126, and the fourth imaging area that is presented to the sensor 26 at time $t_3$ is indicated at 128. The fourth imaging area includes an overlapping portion 130 that overlaps with the third imaging area 118. As shown, the fourth imaging area 128 includes an overlapping portion 132 that overlaps the second imaging area 108 and part of the first imaging area 98. The fourth imaging area 118 also includes an overlapping portion 132 that overlaps the first imaging area 98. The fourth imaging area 128 is sampled and the resulting fourth image 129 is stored in memory 42.

Figure 8B:
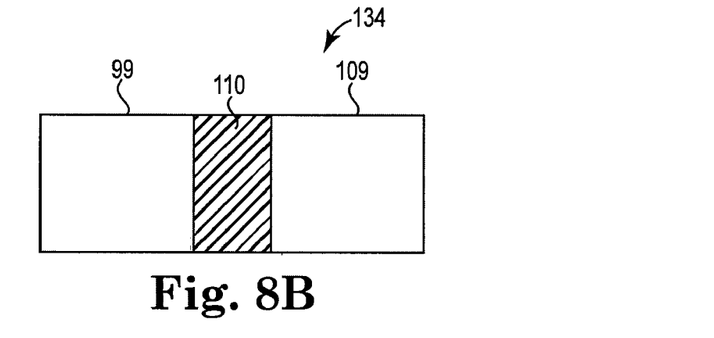
FIGS. 8B-8D are schematic diagrams of the operation of the system of FIG. 3 as it assembles the sampled images into a final image.
Figure 8C:
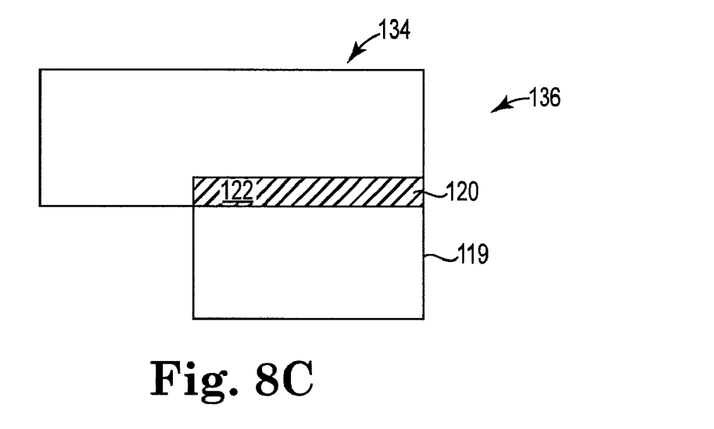
Figure 8D:
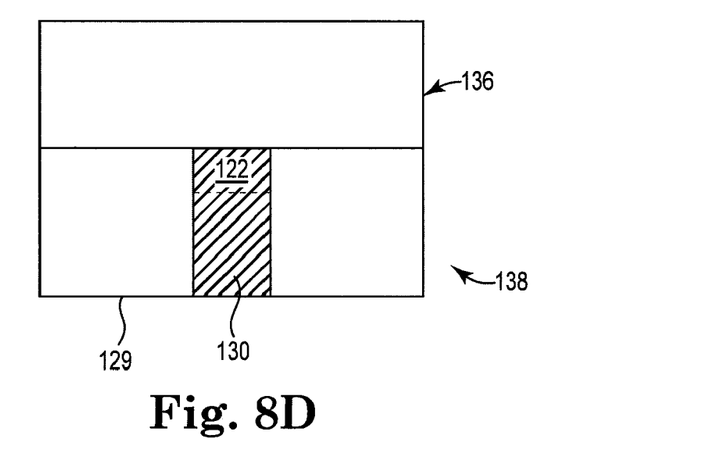

FIGS. 8B-8D are schematic diagrams of the operation of the system 20 to assemble the sampled first through fourth images 99, 109, 119, 129 into a series of partial mosaics and then into a final image.

FIG. 8B shows the assembly of the first image 99 with the second image 109. These images correspond with the first and second imaging areas 98 and 108, respectively, sampled by the sensor 26 and now obtained by the processor 40. The first and second images 99, 109 include an overlapping portion 110, which corresponds with the overlapping portions of the imaging areas 98, 108. The images 99, 109 are adjacent (which can mean at least one of positionally adjacent or temporally adjacent) to each other. The images 99, 109 are both positionally and temporally adjacent to each other in that image 99 includes an overlapping portion 110 with image 109 and image 109 was sampled immediately after image 99.

The processor 40 manipulates the images 99, 109 in order to determine a common pattern, generally identical areas of each image 99, 109, or identical areas of each image 99, 109 in the overlapping portions in order to align the images together into a mosaic. Noise, movement of the object or system, or the like, can make difficult determining identical areas of each image in the overlap portion 110. In still another example, the position of the image selection assembly can be included in the data of the images so as to use the position data to help align the images 99, 109. Once the images are aligned, the processor can combine the two images 99, 109 into a partial mosaic 134 and remove noise, inconsistencies in the overlap region 110, and other image processing on the partial mosaic.

FIG. 8C shows image 119 now obtained by the processor 40 with the partial mosaic 134. Image 119 corresponds with imaging area 118 sampled by the sensor 26. Image 119 is adjacent to image 109, now included in the partial mosaic 134, and images 109, 119 include an overlapping portion 120, which corresponds with the overlapping portions of the imaging areas 108, 118. The imaging areas also include an overlapping portion 122 between imaging areas 98, 118, and aligning the images could also be based on this overlapping area in another example. In the present example, the overlapping portions of the temporally and positionally adjacent images 109, 119 are used because they provide a larger area allowing for greater correspondence and also because they are closer together in time of sample so that movement artifacts are likely reduced.

The processor 40 manipulates the images 109, 119 in order to align the images together into the partial mosaic. Once the images are aligned, the processor can combine the two images 109, 119 into a partial mosaic 136 including three images 99, 109, 119. Further image processing on the partial mosaic can occur at this stage, or it can be postponed, at least in part, until all of the set of selected images are combined into the final mosaic.

FIG. 8D shows image 129, the final image in the set of selected images, now obtained by the processor 40 with the partial mosaic 136. Image 129 corresponds with imaging area 128 sampled by the sensor 26. Image 129 is adjacent to image 119, now included in the partial mosaic 136, and images 119, 129 include an overlapping portion 130, which corresponds with the overlapping portions of the imaging areas 118, 128. Other overlapping portions, corresponding with overlapping portions 122, 132 of imaging areas 98, 108, could also be used in other examples. The image 129 is aligned with image 119 part of partial mosaic 136 in a manner described above. Once aligned, image 129 is combined with image 119 and a complete mosaic 138 is formed. This mosaic 138 can be subjected to image processing. A final image is formed from the mosaic 138, which includes a greater size or resolution than the corresponding size or resolution of the sensor 26.

The present invention has now been described with reference to several embodiments. The foregoing detailed description and examples have been given for clarity of understanding only. Those skilled in the art will recognize that many changes can be made in the described embodiments without departing from the scope and spirit of the invention. Thus, the scope of the present invention should not be limited to the exact details and structures described above, but rather by the appended claims and equivalents.

What is claimed is:

1. An imaging system, comprising:
    a sensor including at least one of a resolution and a size, wherein the sensor is disposed on a fixed optical axis and wherein the sensor is adapted to receive and sample images;
    an image selection assembly including a movable optical element coupled to an actuator, the movable optical element including a movable optical axis movable with respect to the fixed optical axis;
    a position control operably coupled to the actuator, wherein the position control is adapted to select a plurality of positions of the movable optical axis through movement of the optical element with the actuator;
    a sampling control operably coupled to the position control and to the sensor, the sampling control receiving the position of the movable optical axis from the position control, wherein the sampling control is adapted to cause the sensor to sample a first image at a first selected location of the movable optical axis and to subsequently sample at least a second image at a second selected location of the movable optical axis, wherein the second selected location is determined by information received from the position control, and wherein the first image and the second image do not contain an overlapping portion; and
    a processor operably coupled to the sensor and adapted to receive the first and at least second sampled images, wherein the processor is adapted to assemble the received sample images into a final image having a greater size or resolution than the corresponding size or resolution of the sensor and wherein the processor aligns the received sample images during the assembly with interpolation.

2. The imaging system of claim 1, and further including a focal plane, wherein the sensor is generally planar and is disposed generally in the focal plane.

3. The imaging system of claim 2, wherein the fixed optical axis is generally perpendicular to the focal plane.

4. The imaging system of claim 1 wherein the sensor is included within an optical camera and the optical camera is operably coupled to the movable optical element.

5. The imaging system of claim 1 and further including a memory operably coupled to the sensor and to the processor, and wherein the memory is adapted to receive the first and at least second sampled images from the sensor and to provide the first and at least second sampled images to the processor.

6. The imaging system of claim 1, wherein the second selected location is along a third dimension such that the at least the second image is selected at various distances a long a fixed optical axis.

7. A method suitable for use with an imaging system having an image selection assembly receiving images along a movable optical axis, and providing the images to a sensor disposed on a fixed optical axis, wherein the movable optical axis is movable with respect to the fixed optical axis, the method comprising:
    positioning the movable optical axis at a selected first position to obtain a first image at a given time;
    sampling the first image with the sensor wherein the sampled first image includes a size or a resolution;
    repeatedly positioning the movable optical axis at a subsequent uniquely selected position to obtain another image and sampling the another image until a selected number of plurality of images are sequentially sampled at a plurality of uniquely selected positions, each of the plurality of uniquely selected positions being selected such that the plurality of images do not contain an overlapping portion; and
    assembling the sampled images into a final image having a greater size or resolution than the corresponding size or resolution of the sampled first image, wherein the sampled images are aligned during the assembling of sample images with interpolation.

8. The method of claim 7 wherein the selected number of samples is four and repeatedly positioning occurs thrice.

9. The method of claim 7 and further comprising storing the sampled images until assembling the sampled images.

10. The method of claim 9 wherein the images are retrieved from storage and assembling begins after the second image is sampled but prior to the selected number of images are all sampled.

11. The method of claim 7, wherein assembling the sampled images into a final image includes:
    using position data to align the images; and
    removing noise and inconsistencies within the final image.

* * * * *